United States Patent Office 3,350,185
Patented Oct. 31, 1967

3,350,185
METHOD OF ELIMINATING A FOAM BLANKET ON THE SURFACE OF MOLTEN GLASS
Robert R. Rough, Toledo, Ohio, assignor to Owens-Illinois, Inc., a corporation of Ohio
No Drawing. Filed Jan. 18, 1965, Ser. No. 426,438
15 Claims. (Cl. 65—32)

The present invention relates generally to a method of producing glass, and more specifically to producing glass by a method enabling surface foam to be dissipated or eliminated from the glass during the melting phase of its production. The present invention, in its more specific aspects, also relates to a method of producing glass which is particularly suitable for employment in conjunction with what are commonly referred to as direct-fired glass melting furnaces.

In direct-fired types of glass melting furnaces, among others of which are such conventional types as day tanks, pot furnaces and continuous melting furnaces and the like, the glass is ordinarily produced or manufactured, at least in part, by transforming raw glass batch materials into molten glass in the melting portion of a glass "tank" or glass melting furnace. The transformation of the glass batch into molten glass is, again according to ordinary and customary procedure, accomplished primarily by subjecting the glass batch and surrounding or accompanying molten glass, which is also intended to include accompanying semi-molten glass, to the influence of combustion heat. The combustion heat is generated by the combustion of fuel, such as gas and/or oil, in an upper region of the glass melting portion of the tank or furnace which overlies and is directly exposed to the glass batch and accompanying molten glass. By virtue of both direct and indirect conduction, radiation and convection, the glass batch and accompanying molten glass derive and absorb a portion of the overhead combustion heat. The extent of the heat derived and absorbed, however, is subject to numerous factors, conditions and occurrences taking place within the melting portion of the tank or furnace, not the least of which are factors, conditions and occurrences taking place within and on the surface of the molten glass itself.

One factor, condition, or occurrence, commonly having a substantial detrimental effect upon the heating and melting efficiencies of direct-fired glass melting furnaces is that which results during the melting process and causes the formation of foam which accumulates on and floats in the form of a foam layer, or "blanket" upon the surface of the molten glass within the melting portion, region, or "zone," of direct-fired glass melting furnaces. The cellular and gasiform nature of the foam layer, or blanket, causes it to possess a very low heat transfer coefficient, or K-factor, and, of course, renders it extremely resistant to heat penetration. As a consequence, the underlying molten glass, and glass batch are deprived of substantial amounts of available combustion heat which they would otherwise receive.

Foaming is known to result, at least in part, from the numerous reactions, both chemical and physical, taking place during the melting of the glass and glass batch. Additionally, foaming may occur as a result of air being entrapped in the interstices of the glass batch at the time the glass batch enters the furnace. In any event, the resultant occurrence of such surface foam is quite commonplace in the melting portion of a direct-fired glass melting furnace or "tank," and, being of lower density than the molten glass, the foam accumulates and floats on the surface of the molten glass.

Keeping in mind the detrimental affect such foam formation has upon the heating and melting efficiencies of a direct-fired glass melting furnace, the foam-forming reactions taking place within the glass and glass batch during the melting process are both necessary and desirable for the production of high quality glass. In addition to effecting a break down of many of the glass batch constitutuents into glass forming oxides, the many chemical reactions occurring during the melting of the glass batch also produce an internal mixing or stirring action which fosters an intermixing of the molten glass. Such intermixing both enhances the homogeneity of the molten glass and aids in effecting a more uniform temperature relationship throughout the mass of molten glass within the melting region or zone of the furnace. Consequently, it is not ordinarily desirable or advisable to reduce to any great extent the chemical reactions which give rise to the formation of such surface foam since such chemical reactions, while being a productive source of foam which has a detrimental affect upon the heating and melting efficiencies in the melting portion of the furnace, are an instrumental and beneficial part of the glass-making process.

It is accordingly a principal objective of the present invention to improve the heating and melting efficiencies within the melting portion or melting "zone" of direct-fired glass melting "tanks" or furnaces without detrimentally affecting the reactions taking place during the melting process and giving rise to the formation of foam.

In keeping with the foregoing objective it is another objective of the present invention to provide a method compatible and suitable for use with methods ordinarily employed in producing glass in a direct-fired glass melting "tank" or furnace, and which will effectively dissipate foam from the surface of molten glass being produced in the melting portion of such glass melting "tanks" or furnaces.

Another objective of the present invention is to provide a method for eliminating foam from the surface of molten glass in the melting portion of a direct-fired glass melting furnace by repeatedly varying the oxygen content of the combustion atmosphere overlying the surface of the molten glass.

Other objects and advantages of the present invention will readily become apparent to those skilled in the art from the following detailed description.

In accordance with the methods of the present invention, it has been determined that the foam layer which commonly occurs on the surface of molten glass in the melting region of a direct-fired glass melting furnace during the course of glass melting operations may be eliminated or dissipated and substantially reduced. In general, the salient aspects of the present invention are directed to this determination and are embodied in a method which includes the step of periodically varying the composition of the combustion atmosphere in the melting portion or melting region of a direct-fired glass melting furnace. Such periodic changes in the combustion atmosphere are controlled and accomplished in such manner that the changes in combusted atmosphere are successively repeated at relatively short time intervals. Although, such successive changes in combustion atmosphere are preferably continued throughout the duration of the glass melting process, such successive changes should be continued at least throughout the duration of the conditions giving rise to substantial foaming in the melting portion of the furnace. In further regard to the present invention, it has been ascertained that by rapidly changing the oxidizing or reducing characteristics of the combustion atmosphere within the melting region of the furnace it is not only possible to preclude the formation of a sizable foam layer upon the surface of molten glass, but it is also possible, as well, to remove a pre-existing foam layer from the surface of the molten glass. As a consequence, there is an attendant increase in the amount of heat transmitted to the molten glass and an increase in the heating and melting efficiency of the furnace. As a further consequence of such improved heat transmission, there is a promotion in the movements of the convection currents and in the overall heat distiribution throughout the molten glass in the melting portion of the furnace. Due to the resultant improved mixing characteristics and heat distribution, the molten glass is less susceptible to the entrapment of seeds and stones and cord formation.

In one more specific aspect, the present invention involves repeatedly changing the combustion atmosphere within the melting region of the furnace by periodically introducing either an oxidizing or a reducing agent or material into the combustion atmosphere in the melting region of the furnace; the periodic timing of such introductions being closely spaced so as to occur at least every ten or fifteen minutes. It is not necessary, however, to change the combustion atmosphere so completely that it is converted from an oxidizing to a reducing atmosphere or from a reducing atmosphere to an oxidizing atmosphere. In fact such an extensive change is ordinarily undesirable. Merely changing the combustion atmosphere from one level of oxidation or reduction to another respective level of oxidation or reduction at a location proximate to the surface of the molten glass will ordinarily suffice to eliminate a pre-existent layer of surface foam or to preclude or dissipate the formation of a foam surface layer upon the molten glass. Furthermore, it has been ascertained that a substantial change in atmospheric conditions throughout the entirety of the melting region of the furnace is unnecessary. The changing conditions in the combustion atmosphere need only occur on or in the immediate vicinity of the surface of the molten glass. This latter procedure is also in accord with the preferred manner for carrying out the method of this invention. For example, the reducing or oxidizing agent or material, whichever the case may be, is directed towards or onto the surface of the molten glass and particularly that surface portion of the molten glass where foam formation tends to be most prevalent. Thus, where the nature of the melting operation is such that it is necessary that the combustion atmosphere be maintained in either an oxidizing condition or in a reducing condition, such conditions can still be maintained while at the same time utilizing the method of this invention to prevent or dissipate surface foam from the molten glass.

Suitable examples of combustible reducing agents which may be utilized are oil, raw gas, powdered carbon or other types of similarly combustible materials such as cellulosic materials, including finely divided wood chips or paper. The combustible reducing agent is introduced into the combustion atmosphere within the melting portion of the furnace and directed proximate to or onto the surface of the molten glass. Whereupon, the combustible nature of the reducing agent or material causes it to undergo rapid ignition and combustion, and to produce a sudden depletion in the oxygen content in the combustion atmosphere at the surface of the molten glass. Attendant with the combustion of the reducing agent or material and the sudden change in the combustion atmosphere at the surface of the molten glass, it has been observed that there is a sudden dissipation of surface foam. Similar results have attended the same manner of introduction of a combustible oxidizing agent or material, such as oxygen. Although the exact nature of the relationship between the affect of suddenly changing the oxygen content of the combustion atmosphere and the dissipation of surface foam is not fully understood nor of such a character that it is capable of being discussed herein with assurance as to the correctness thereof, it is believed that a sudden change is effected in the surface tension characteristics of the foam or of the molten glass, or both. And it is believed that it is this sudden change in surface tension characteristics which causes the layer of foam to rapidly dissipate and disintegrate. Irrespective of the particular phenomena which occurs, however, it has been clearly demonstrated that the surface foam may be quickly dispelled from the molten glass by directing a combustible reducing agent or material, or a combustible oxidizing agent or material onto or near to the surface of the molten glass within the melting portion or region of a direct-fired glass melting furnace.

One particularly suitable and representative example of a method of foam elimination, according to the present invention, involves directing a small stream of oil onto the surface of the molten glass. The oil upon striking the molten glass surface quickly spreads out into a thin surface film and ignites. As a consequence of such ignition and accompanying sudden depletion of oxygen in the combustion atmosphere at or in the proximate vicinity of the surface of the molten glass, there is produced an unstable condition which in turn effects a disintegration and dissipation of foam carried upon the surface of the molten glass. Although most any grade oil may be used, the oil should of course be such a composition that it is essentially free of contaminants or chemicals which might deleteriously affect the glass forming constituents. This, however, is rarely a problem. Similarly, the oil should be devoid of appreciable amounts of non-combustible ingredients which might remain as residual products on the surface of the molten glass after combustion. A preferable grade of oil is one, such as No. 2 grade oil, which is sufficiently fluid that it may be conveniently handled and pumped in conventional manner through a relatively small diameter feed line. Use of a small discharge enables a closer control over the relatively small quantity of oil which is intermittently introduced. For example, it has been found that extremely good defoaming can be achieved over a 280 square foot area of molten glass in a direct-fired glass melting furnace by introducing even just one ounce of No. 2 oil suddenly onto the surface of the molten glass at intermittent periodic intervals of every three minutes using an oil feed line having a one-eighth inch diameter discharge outlet.

An example utilizing a gaseous fuel rather than oil is described hereinafter and, like the preceding example, the following example is set forth for exemplary purposes only and should not be construed as a limiting example of the present invention.

Natural gas of the type commonly utilized as a combustion fuel in glass melting operations was introduced into the melter section of a continuous direct-fired glass melting furnace by feeding the gas from the gas discharge end of a one-half inch gas feed line leading into the forward end of the melter section through bridge wall peepholes. Effective operative control of the gas supplied to the melter section was effected by the utilization of conventional controls such as a timer controlled solenoid valve, a pressure reducing valve and a pressure gauge all operatively installed in the gas feed line. The capacity of the melter section was such that it had a melting capacity of about 35.6 tons of glass per day when operating under normal operating conditons. Prior to initiation of the method of the present invention, the melter section contained a heavy blanket of surface foam extending forwardly from the floating piles of batch at the rearward end of the melter up to the bridge wall at the forward end of the melter section. Within a period of six and one-half hours after the commencement of the method of the present invention, and without changing other furnace operating or melting conditions, the surface foam was caused to dissipate and to recede to such an extent that only an incidental amount of surface foam remained at the location of the piles of floating batch situated at the rearward end of the melter section. The dissipation and recession of the surface foam was accomplished quite rapidly by intermittently introducing the natural gas from the gas feed line into the forward end of the melter section under a pressure of 20 p.s.i.g., with each such introduction of gas lasting for a period of approximately five seconds and being repeated approximately every thirty seconds. In other words, the total time cycle for each intermittent introduction of combustible gas was approximately thirty-five seconds and was such that the timer operated solenoid valve functioned to open the gas feed line for a time interval of five seconds and to thereafter close the gas feed for a time interval of thirty seconds. Although the particular pressure and time sequences described above have been found to be particularly suitable for elimination of foam in the melter section of a continuous type of direct-fired glass melting furnace and having a normal melting rate of about 36.6 tons of glass per day, it should be clearly apparent that both the gas pressure and intermittent time sequence for the introduction of the gas are subject to considerable variability. For example, excellent foam elimination has also been achieved in direct-fired glass melting furnaces having a normal glass melting rate of 35–50 tons per day utilizing apparatus such as that described above. Furthermore, such foam elimination has been achieved with variations in gas pressure ranging from 10 p.s.i.g. to 25 p.s.i.g. and with varied time cycles in which the frequency of gas introduction varied between about five and three hundred seconds, or longer, and in which the duration of gas introduction varied between about five and sixty seconds.

In other instances such surface foam has been dissipated by the intermittent introduction and the rapid ignition of cellulosic materials, such as wood chips and paper, at the surface of the foam covered molten glass. Similarly, powdered carbon introduced onto the surface of the molten glass has effected a dissipation of foam. It should be clearly apparent therefore that most any rapidly combustible material or agent may be employed which is essentially free from residual contaminants.

From the foregoing, it will be readily appreciated that the present invention provides a method for eliminating, or at least substantially reducing, the extent of foam which ordinarily occurs on the surface of molten glass within the melter section or melting portion of a direct-fired glass melting furnace. As a consequence of such foam elimination or foam reduction, both the heating and melting efficiency of the glass melting furnace may be greatly increased without the necessity of increasing or otherwise altering the construction characteristics of the furnace and without the necessity of intensifying the glass melting temperatures within the melter section of the furnace. Additionally, the beneficial intermixing of the molten glass which attends certain chemical and physical reactions giving rise to foam formation during the melting process remains unaffected while the detrimental affects of the foam are obviated. It will also be readily apparent that the quantity of combustible material, or fuel, which is employed to accomplish the foam removal is more than compensated for by the overall heating efficiency which attends the elimination or reduction of the commonly occurring foam surface layer. Otherwise stated, the quantity of fuel ordinarily employed for melting of the glass may be reduced to an extent far exceeding the quantity or cost of the combustible material directed onto or near to the surface of the molten glass. Consequently, a substantial fuel economy is effected.

It will also be readily apparent to those familiar with the glass making art that since numerous combustible materials, other than the representative examples specified herein, may be similarly employed with beneficial results, such representative examples are to be considered as illustrative rather than restrictive. It will, of course, be therefore understood that the various examples that have been described above in compliance with the Patent Statutes may be varied throughout a wide range without departing from the principles of the present invention, and it is therefore not the purpose of such examples to limit the patent granted hereon otherwise than as may be necessitated by the scope of the appended claims.

I claim:
1. In a method of producing glass in the melting portion of a direct-fired glass melting furnace, including producing such glass, at least in part, from glass batch materials by transforming said glass batch materials into molten glass under the influence of combustion heat generated in said melting portion by a constant combustion of fuel in an oxygen containing combustion atmosphere overlying said glass batch and molten glass, which method tends to produce an accumulation of foam on the surface on said molten glass, the improvement in said method comprising intermittently varying the oxygen content of said combustion atmosphere, whereby said foam is caused to be dissipated from the surface of said molten glass.

2. In a method of producing glass in the melting portion of a direct-fired glass melting furnace, including producing such glass, at least in part, from glass batch materials by transforming said glass batch materials into molten glass under the influence of combustion heat generated in said melting portion by a constant combustion of fuel in an oxygen containing combustion atmosphere overlying said glass batch and molten glass, which method tends to produce an accumulation of foam on the surface on said molten glass, the improvement in said method comprising altering the surface characteristics of said molten glass by intermittently and repeatedly varying the oxygen content of said combustion atmosphere in a region proximate to the surface of said molten glass, whereby said foam is caused to be dissipated from the surface of said molten glass.

3. In a method of producing glass in the melting portion of a direct-fired glass melting furnace, including producing such glass, at least in part, from glass batch materials by transforming said glass batch materials into molten glass under the influence of combustion heat generated in said melting portion by a constant combustion of fuel in an oxygen containing combustion atmosphere overlying said glass batch and molten glass, which method tends to produce an accumulation of foam on the surface on said molten glass, the improvement in said method comprising changing the surface tension characteristics of said molten glass by rapidly and intermittently reducing the oxygen content of said combustion atmosphere in a region immediately overlying the surface of said molten glass, whereby said foam is caused to be dissipated from the surface of said molten glass.

4. In a method of producing glass in a direct-fired glass melting furnace, including forming such glass, at least in part, from glass batch by transforming said glass batch into molten glass under the influence of combustion heat generated by the combustion of fuel within a combustion atmosphere composed, at least in part, of oxygen and maintained in the melting portion of said glass melting furnace above the surface of said glass batch and molten glass, the improvement in said method comprising intermittently and repeatedly altering the surface characteristics of said molten glass by intermittently and repeatedly varying the oxygen content of that portion of said combustion atmosphere located in a region proximate to the surface of said molten glass to an extent substantially greater than the portions of said combustion atmosphere located in regions remote from the surface of said molten glass.

5. In a method according to claim 4, wherein said step of intermittently and repeatedly varying the oxygen content of the combustion atmosphere is accomplished by introducing a rapidly combustible material into that region of the combustion atmosphere located proximate to the surface of the molten glass, thereby causing said combustible material to ignite and rapidly deplete the oxygen content of said combustion atmosphere at a location proximate to the surface of the molten glass.

6. In a method according to claim 5, wherein said combustible material is a combustible fluid substance.

7. In a method according to claim 6, wherein said combustible fluid substance is fuel oil.

8. In a method according to claim 7, wherein said fuel oil is a No. 2 grade of fuel oil.

9. In a method of manufacturing glass in a direct-fired glass melting furnace including melting glass batch into molten glass in the melting portion of said furnace under the influence of heat generated by the combustion of fuel in said melting portion, said combustion being carried out in a combustion atmosphere above said glass batch and molten glass and composed, at least in part, of oxygen, the improvement in such method comprising intermittently and repeatedly varying the oxygen content of said combustion atmosphere by introducing a rapidly combustible solid material into the region of said combustion atmosphere proximate to the surface of said molten glass to thereby intermittently and repeatedly rapidly deplete the oxygen content of said combustion atmosphere.

10. In a method according to claim 9, wherein said rapidly combustible solid material is essentially a carbonaceous and finely divided material.

11. In a method of manufacturing glass including forming such glass, at least in part, from glass batch materials by transforming said glass batch materials into molten glass under the influence of the heat of combustion generated in a melting zone by constant combustion of fuel and a combustion atmosphere, composed, at least in part, of oxygen, the improvement comprising the step of intermittently and repeatedly varying the oxygen content of said combustion atmosphere within said melting zone.

12. In a method comprising the improvement defined in claim 11, wherein said step of intermittently and repeatedly varying the oxygen content of said combustion atmosphere includes the step of intermittently and repeatedly depleting the oxygen content of said combustion atmosphere proximate to the surface of said molten glass.

13. In a method according to claim 12, accomplishing said step of intermittently and repeatedly depleting the oxygen content of said combustion atmosphere by sequentially introducing a rapidly combustible cellulosic material into a region of said combustion atmosphere located proximate to the surface of said molten glass.

14. In a method of making glass wherein materials for forming such glass are transformed into a molten state in a glass making furnace and contained in a zone thereof wherein combustion of fuel is carried on affecting the temperature of the molten glass in said zone, the zone also including a combustion atmosphere, composed, at least in part, of oxygen, the improvement comprising intermittently and repeatedly varying the oxygen content of the combustion atmosphere within said zone.

15. In a method of making glass from molten glass forming materials, the steps comprising exposing a surface region of said molten glass forming materials to a combustion atmosphere having an ignition temperature below that of the temperature of said surface region and composed, at least in part, of oxygen, and intermittently and repeatedly varying the oxygen content of said combustion atmosphere to affect the characteristics of said surface region.

References Cited

UNITED STATES PATENTS

| | | | |
|---|---|---|---|
| 2,331,052 | 10/1943 | Shadduck | 65—134 |
| 2,773,111 | 12/1956 | Arbeit et al. | 65—136 |
| 2,832,958 | 4/1958 | Penberthy | 65—135 |

DONALL H. SYLVESTER, *Primary Examiner.*

G. R. MYERS, *Assistant Examiner.*